Figure 3:
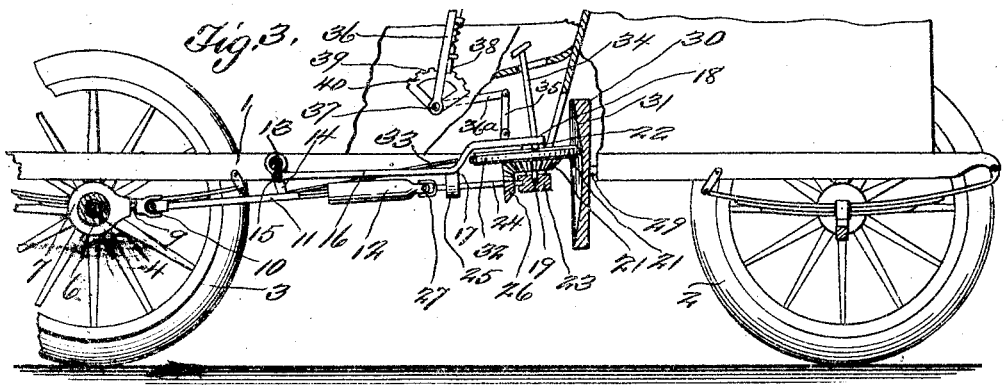

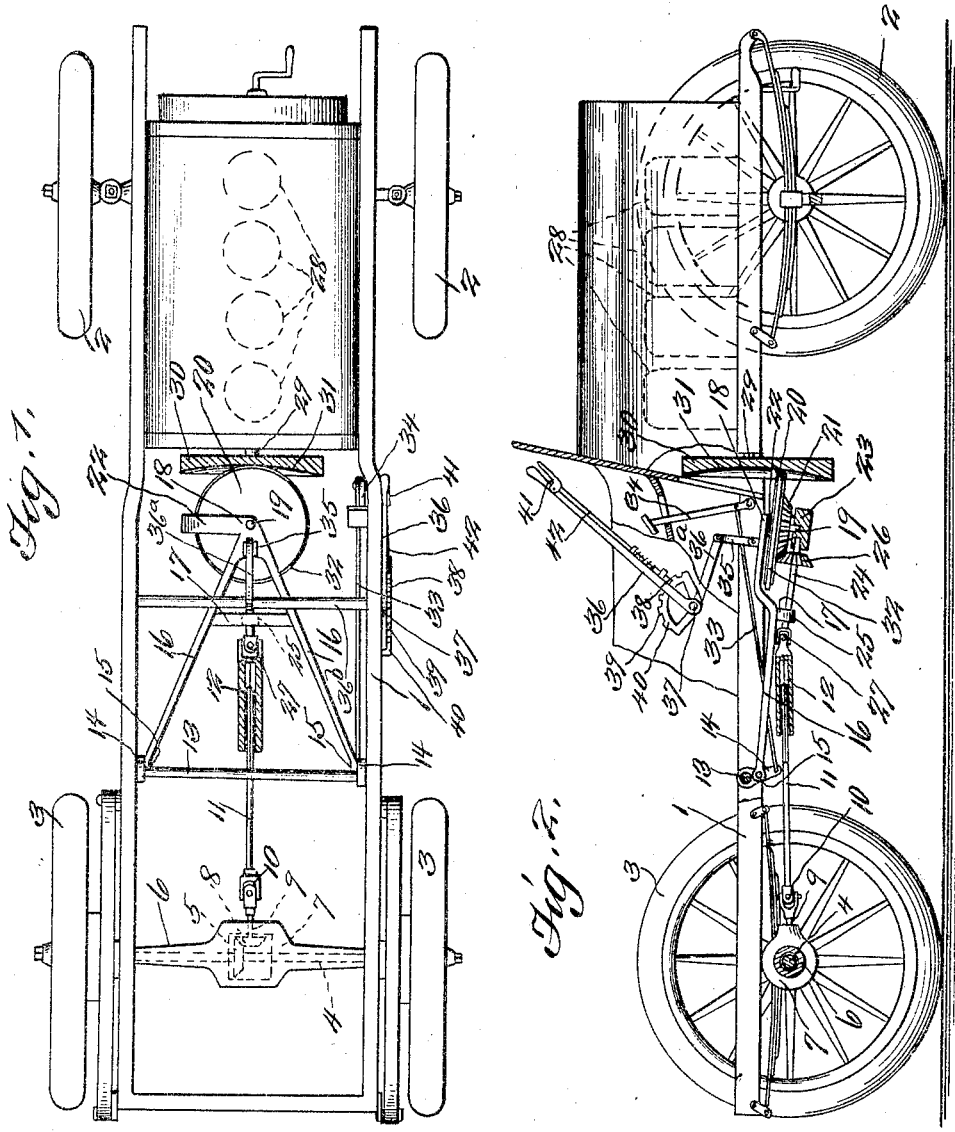

L. VORHIES.
POWER TRANSMISSION DEVICE.
APPLICATION FILED APR. 1, 1911.

1,014,102.

Patented Jan. 9, 1912.

2 SHEETS—SHEET 2.

Witnesses

Inventor
Leroy Vorhies,
By D. Swift &C.
Attorney

UNITED STATES PATENT OFFICE.

LEROY VORHIES, OF YODER, COLORADO.

POWER-TRANSMISSION DEVICE.

1,014,102.  Specification of Letters Patent.  Patented Jan. 9, 1912.

Application filed April 1, 1911. Serial No. 618,421.

*To all whom it may concern:*

Be it known that I, LEROY VORHIES, a citizen of the United States, residing at Yoder, in the county of El Paso and State of Colorado, have invented a new and useful Power-Transmission Device for Automobiles; and I do hereby declare the following to be a full, clear, and exact description of the invention, such as will enable others skilled in the art to which it appertains to make and use the same.

This invention relates to the art of motor vehicles, and it more especially pertains to a new and useful power transmission device.

The invention in its broadest scope aims as its primary object to provide a device of this nature, so constructed and including means, so that the speed of the automobile may be gradually and steadily increased or decreased, said means acting also as a medium, whereby the automobile may be reversed.

A further object of the invention is to provide the engine driven shaft with a concave friction wheel, with which a wheel having a fiber band engages, for frictionally transmitting power to the rear driving shaft of the automobile.

In the drawings, however, there is only disclosed one form of the present invention, but in practical fields, this form may require alterations, to which the applicant is entitled provided the alterations are comprehended by the appended claims.

The invention comprises further features and combination of parts, as hereinafter set forth, shown in the drawings, and claimed.

Figure 4:
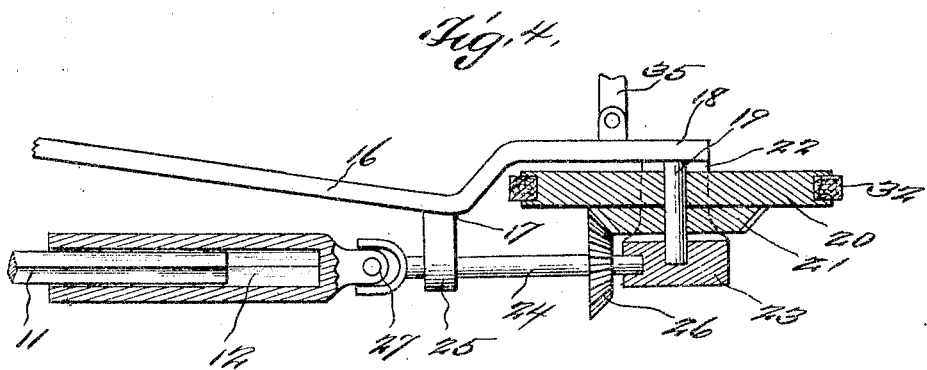
Figure 5:
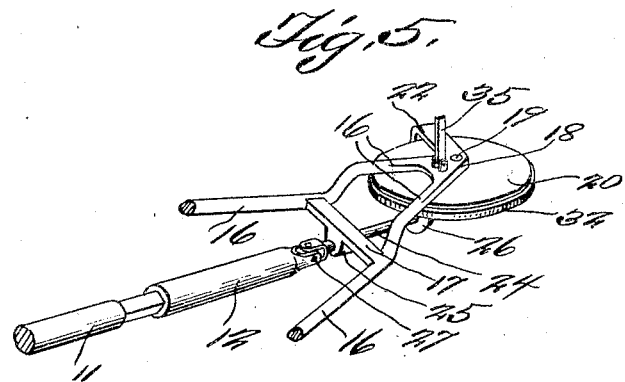

In the drawings:—Figure 1 is a plan view of the skeleton frame of an automobile, showing the improved power transmission device as applied. Fig. 2 is a view partly in section and partly in elevation of the skeleton frame, showing the friction band wheel in one position. Fig. 3 is a view similar to Fig. 2 showing another position of the friction band wheel. Fig. 4 is an enlarged detail view in elevation of the power transmission device. Fig. 5 is a perspective view of the same.

Referring to the accompanying drawings, 1 designates the skeleton frame, while 2 and 3 denote the front and rear wheels, the rear wheels being carried by the axle 4, with which the bevel gear 5, shown in dotted lines in Fig. 1 rotates. The axle 4 is provided with a casing 6 having a centrally located enlarged portion 7, in which the beveled gear 5 and the beveled gear 8 are arranged. The bevel gear 8 is carried by and rotatable with the shaft 9, which is mounted in a suitable bearing in the enlarged portion of the casing. The shaft 9 is provided with a universal connection 10 with the shaft 11, which is mounted in a bearing 12.

Extending transversely of the frame 1, and mounted in bearings thereof, is a shaft 13, and extending downwardly from this shaft at each end are the arms 14. Pivoted to the arms, as at 15, are the rear ends of the triangular shaped frame 16. This triangular shaped frame is provided with a transverse brace 17. Mounted in a suitable bearing in the apex 18 of the frame is a shaft 19, with which the friction wheel and beveled gear 20 and 21 are rotatable. Projecting from the apex 18 of the frame 16 is an arm 22 which turns under the friction wheel 20, thus providing a bearing 23 for the lower end of the shaft 19. Also mounted in the bearing 23 and in the bearing 25 of the frame 16 is a shaft 24, with which the bevel gear 26 is rotatable. The bevel gear 26 meshes with the bevel gear 21. The shaft 24 is provided with a universal connection 27 with the bearing 12 (which is in the form of a sleeve, rectangular in cross section) in which the shaft 11 is slidably mounted. The usual form of four cylinder engine is provided upon the forward portion of the frame, as shown at 28, and fixed to rotate with the shaft 29 of the engine is a friction drive wheel 30, one face of which is concaved as shown at 31. The curvature of the concave face 31 is drawn on the arc of a circle, using the center of the shaft 13 as a center. The friction wheel 20 is provided with a fiber band 32 on its periphery, which is designed to engage the concave face 31, so that when the friction wheel 30 is rotated, the friction wheel 20 will in turn rotate.

The lower end of one of the arms 14 has connected to it a rod 33, the forward end of which is connected to a foot lever 34. By pressing on the lever 34, the shaft 13 will be rocked, and when rocked, the triangular shaped frame 16 will be moved forward, which will cause the friction wheels 20 and 30 to closely contact. When the triangular frame 16 is moved forward in this manner, the bearing 12 moves telescopically on the end of the shaft 11. Connected to the apex 18 of the frame 16 is a link 35, which in turn is pivoted to one arm of the bell crank lever 36. The bell crank lever 36 is pivoted at 37, and is provided with a dog 38, designed to engage the teeth 39 of the quadrant 40. To operate the dog, so as to engage or disengage it with or from the teeth of the quadrant a hand-grip 41 is carried by the bell crank lever 36, which handgrip is connected to the dog by means of the rod 42. When it is desired to decrease the speed of the rear driving axle, the friction wheel 20 is brought nearer to the center of the friction wheel 30, and it will be observed that to increase the speed the wheel 20 should be brought nearer to the outer portion of the wheel 30. To drive the machine forward the friction wheel 20 should engage the friction wheel 30 below the center of the friction wheel 30, as shown in Fig. 2, but to reverse the machine, the friction wheel 20 should be moved above and past the center of the friction wheel 30, as shown in Fig. 3. It will be observed that by the bell crank lever 36, the friction wheel 20 may be moved in these various positions, and held in such positions, by engagement with the dog with the teeth of the quadrant. When the friction wheel 20 is rotated by the wheel 30, the bevel gear 21 is in turn rotated. The bevel gear 21 in turn rotates the bevel gear 26, which transmits motion to the rear driving axle or shaft 4, by means of the shafts 24 and 11, and the bevel gears 5 and 8.

From the foregoing, it is to be observed that there has been provided a novel, efficient and practical power transmission device, adapted for use upon automobiles.

The invention having thus been set forth, what is claimed as new and useful, is:

1. In combination, a revoluble friction wheel having a concave face, an oscillatory frame, a friction wheel carried thereby to engage the concave face, a rear driving axle, a shaft having connections therewith, a telescopical connection between the shaft and the oscillatory frame, and means for adjusting the oscillatory frame, said means including means for holding the frame adjusted.

2. In combination, a frame, a revoluble friction wheel having a concave face, an oscillatory frame connected to the frame, a rear driving shaft, a shaft having gear connections with the driving shaft, said oscillatory frame having a telescopical connection with the second shaft, a friction wheel carried at the free end of the oscillatory frame, gear connections between the second friction wheel and the telescopical connections, for transmitting motion to the driving shaft, and means for adjusting the oscillatory frame whereby the mechanism may be reversed, or the speed increased or decreased.

3. In combination, a frame, a revoluble friction wheel having a concave face, an oscillatory frame connected to the frame, a rear driving shaft, a shaft having gear connections with the driving shaft, said oscillatory frame having telescopical connections with the second shaft, a friction wheel carried at the free end of the oscillatory frame, gear connections between the second friction wheel and the telescopical connections, for transmitting motion to the driving shaft, means for adjusting the oscillatory frame whereby the mechanism may be reversed, or the speed increased or decreased, said means including means for holding the oscillatory frame in adjusted positions, and means for increasing or decreasing the frictional contact between the two friction wheels.

4. In combination, a frame, a revoluble friction wheel having a concave face, an oscillatory frame connected to the frame, a rear driving shaft, a shaft having gear connections with the driving shaft, said oscillatory frame having a telescopical connection with the second shaft, connections between the friction wheel and the second shaft whereby motion is transmitted from the friction wheel to the driving shaft, and means for adjusting the oscillatory frame whereby the second connections may be reversed in motion so that the mechanism may be reversed, the adjusting means for the oscillatory frame constituting means whereby the speed of the second connections may be increased or decreased.

5. In combination, a frame, a revoluble friction wheel having a concave face, an oscillatory frame connected to the frame, a rear driving shaft, a shaft having gear connections with the driving shaft, said oscillatory frame having a telescopical connection with the second shaft, connections between the friction wheel and the second shaft whereby motion is transmitted from the friction wheel to the driving shaft, and means for adjusting the oscillatory frame whereby the second connections may be reversed, the adjusting means for the oscillatory frame constituting means whereby the speed of the second connections may be increased or decreased, said second connections including a friction wheel, and means for increasing the friction between the two friction wheels.

6. In combination, a frame, a driven shaft, a friction wheel connected thereto and provided with a concave face, an angular frame having fulcrum connections with the first frame, a friction wheel at its free end to contact with the concave face of the first wheel, means for raising and lowering the angular frame for adjusting the second friction wheel with relation to the first friction wheel, means having connections with the fulcrum connections for increasing the friction between the friction wheels, and means having connections with the second friction wheel so as to be operated thereby.

7. In combination, a frame, a driven shaft, a friction wheel connected thereto and provided with a concave face, an angular frame, arms pivoted to each side of the first frame, to which the angular frame is fulcrumed, a second friction wheel carried at the free end of the angular frame to contact with the concave face of the first wheel, means for raising and lowering the angular frame for adjusting the second friction wheel with relation to the first friction wheel, means having connections with the free ends of said arms for moving the angular frame forwardly, thereby increasing the friction between the friction wheels, the second friction wheel having connections whereby the same may be connected to any suitable machinery to be operated thereby.

In testimony whereof I have signed my name to this specification in the presence of two subscribing witnesses.

LEROY VORHIES.

Witnesses:
JACOB W. CLASSEN,
LIDA MUNYAN.